(12) United States Patent
Hirakawa (10) Patent No.: US 10,733,747 B2
(45) Date of Patent: Aug. 4, 2020

(54) IMAGE REGISTRATION APPARATUS, IMAGE REGISTRATION METHOD, AND IMAGE REGISTRATION PROGRAM

(71) Applicant: FUJIFILM Corporation, Tokyo (JP)

(72) Inventor: Shinnosuke Hirakawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 152 days.

(21) Appl. No.: 16/008,546

(22) Filed: Jun. 14, 2018

(65) Prior Publication Data

US 2019/0005662 A1 Jan. 3, 2019

(30) Foreign Application Priority Data

Jun. 30, 2017 (JP) .................................. 2017-129243

(51) Int. Cl.
*G06K 9/00* (2006.01)
*G06T 7/33* (2017.01)
*G06T 7/73* (2017.01)

(52) U.S. Cl.
CPC ............... *G06T 7/344* (2017.01); *G06T 7/33* (2017.01); *G06T 7/73* (2017.01); *G06T 2207/10028* (2013.01); *G06T 2207/10068* (2013.01); *G06T 2207/10081* (2013.01); *G06T 2207/10088* (2013.01); *G06T 2207/20072* (2013.01); *G06T 2207/30061* (2013.01)

(58) Field of Classification Search
CPC ......... G06T 7/0028; G06T 7/337; G06T 7/30; G06T 7/248; G06T 7/0012; G06T 7/0014; G06T 7/20; G06T 2207/10116; G06T 2207/10124; G06K 9/20; G06K 9/00208; G06K 9/4642
See application file for complete search history.

(56) References Cited

U.S. PATENT DOCUMENTS

2014/0336501 A1 11/2014 Masumoto

FOREIGN PATENT DOCUMENTS

| JP | 11-120327 A | 4/1999 |
|----|----|----|
| JP | 2013-150650 A | 8/2013 |
| JP | 2013-192569 A | 9/2013 |
| WO | WO 2014/141968 A1 | 9/2014 |

*Primary Examiner* — Duy M Dang
(74) *Attorney, Agent, or Firm* — Birch, Stewart, Kolasch & Birch, LLP (57) ABSTRACT

An image registration apparatus includes an image acquisition unit that acquires a three-dimensional image obtained by imaging a subject and an image different from the three-dimensional image; a graph structure generation unit that generates a graph structure of a tubular structure included in the three-dimensional image; a contour information acquisition unit that acquires contour information of the tubular structure at each point on the graph structure; and a registration unit that performs registration between the three-dimensional image and the different image on the basis of the contour information.

20 Claims, 10 Drawing Sheets

FIG. 16

IMAGE REGISTRATION APPARATUS, IMAGE REGISTRATION METHOD, AND IMAGE REGISTRATION PROGRAM

CROSS-REFERENCE TO RELATED APPLICATIONS

The present application claims priority under 35 U.S.C. § 119 to Japanese Patent Application No. 2017-129243, filed on Jun. 30, 2017. Each of the above application(s) is hereby expressly incorporated by reference, in its entirety, into the present application.

BACKGROUND OF THE INVENTION

1. Field of the Invention

The present invention relates to an image registration apparatus, an image registration method, and a non-transitory computer readable recording medium storing an image registration program that perform registration between a three-dimensional image obtained by imaging a subject and an image different from the three-dimensional image.

2. Description of the Related Art

In recent years, according to advances in an imaging apparatus, a resolution of image data obtained through imaging using the imaging apparatus has been enhanced, and thus, detailed analysis of a subject has been available on the basis of the image data. For example, in multi slice CT (Multi Detector-row Computed Tomography), a plurality of tomographic images can be captured at a time, and the tomographic images can be captured with thin slice thicknesses. As the slice thicknesses decrease, a resolution of a three-dimensional image in a body axis direction in which the plurality of tomographic images are layered is enhanced, and thus, it is possible to obtain a more detailed three-dimensional image. By displaying and analyzing such a three-dimensional image, it is possible to find a lesion or the like that has not been easily found until now.

As a display method that uses a three-dimensional image as described above, there is a virtual endoscope display (for example, see WO2014/141968A and JP1999-120327A (JP-H11-120327A)). The virtual endoscope display is a method for setting a visual point position in a lumen and generating and displaying a perspective projection image on the basis of the set visual point position. The displayed projection image is a virtual endoscope image. In the virtual endoscope display, a user successively changes visual point positions, and accordingly, it is possible to provide an image as if an endoscope camera performs imaging while moving inside the body.

Particularly, in bronchoscopy that is an inspection using an endoscope, since branches of the bronchus are extremely complicated, a technique for navigating the endoscope while referring to the above-described virtual endoscope display as a "map" is performed. In this case, since it is troublesome to manually sequentially change the virtual endoscope display in accordance with actual movement of the endoscope, a technique for estimating a place in the body where a distal end of the endoscope is present to create a virtual endoscope image is performed.

For example, WO2014/141968A discloses, in order to estimate a distal end position of an endoscope, a technique for performing a registration process with respect to a virtual endoscope image and an actual endoscope image obtained through actual imaging using an endoscope. Further, in JP2013-150650A discloses a technique for acquiring tubular tissue shape data indicating the shape of a tubular tissue in a subject from three-dimensional image data of the subject, acquiring endoscope path data indicating a path of an endoscope inserted in the subject, performing matching between tree-structure data that is the tubular tissue shape data and the endoscope path data, and displaying a virtual endoscope image obtained on the basis of a matching result and an actual endoscope image. Further, JP2013-192569A discloses a technique for performing structure matching by extracting a graph structure in calculating a correspondence positional relationship between two three-dimensional images relating to the same subject that are comparison targets.

SUMMARY OF THE INVENTION

Here, in order to estimate the distal end position of the endoscope for navigation, it is necessary to generate virtual endoscope images from a plurality of visual points, to perform registration between the plurality of virtual endoscope images and an actual endoscope image, and to select a virtual endoscope image that matches most closely the actual endoscope image. Further, as disclosed in JP2013-192569A, in calculating the correspondence relationship between two three-dimensional images, similarly, there is a case where virtual endoscope images are generated from two three-dimensional images and matching between the virtual endoscopes is performed.

In order to enhance estimation accuracy and stability of a distal end position of an endoscope and accuracy of registration between two three-dimensional images, it is necessary to generate a large number of virtual endoscope images. However, a volume rendering process that is a process of generating a virtual endoscope image needs a large amount of computation. Thus, it takes long time to generate the virtual endoscope image. Further, in a case where registration between virtual endoscope images and an actual endoscope image is performed, similarly, it takes long time for computation. As a result, it is difficult to navigate the distal end position of the endoscope in real time.

The invention has been made in consideration of the above-mentioned problems, and an object of the invention is to provide a technique capable of performing registration between a three-dimensional image and an image different from the three-dimensional image at high speed, such as registration between a virtual endoscope image and an actual endoscope image, for example.

According to an aspect of the invention, there is provided an image registration apparatus comprising: an image acquisition unit that acquires a three-dimensional image obtained by imaging a subject and an image different from the three-dimensional image; a graph structure generation unit that generates a graph structure of a tubular structure included in the three-dimensional image; a contour information acquisition unit that acquires contour information of the tubular structure at each point on the graph structure; and a registration unit that performs registration between the three-dimensional image and the different image on the basis of the contour information.

In the image registration apparatus according to this aspect of the invention, the different image may be an actual endoscope image acquired using an endoscope inserted in the tubular structure.

In the image registration apparatus according to this aspect of the invention, the different image may be a three-dimensional image, different from the three-dimensional image, obtained by imaging the subject.

Here, the "different three-dimensional image" means a three-dimensional image captured at a different imaging time, a three-dimensional image captured by a different modality used in imaging, or the like. The three-dimensional image captured by the different modality used in imaging may be a CT image acquired through a CT apparatus, a magnetic resonance imaging (MRI) image acquired through an MRI apparatus, a three-dimensional ultrasound image acquired through a three-dimensional echo ultrasonic apparatus, or the like.

The image registration apparatus according to this aspect of the invention may further comprise: a visual point information acquisition unit that acquires visual point information inside the tubular structure; a projection point specification unit that specifies a projection point from respective points on the graph structure on the basis of the visual point information and the graph structure; and a projection image generation unit that generates a projection image obtained by projecting the contour information at the projection point on a two-dimensional plane, in which the registration unit may perform registration between the three-dimensional image and the different image using the projection image.

The image registration apparatus according to this aspect of the invention may further comprise: a visual point information acquisition unit that acquires visual point information inside the tubular structure; a projection point specification unit that specifies a projection point from respective points on the graph structure on the basis of the visual point information and the graph structure; a projection image generation unit that generates a projection image obtained by projecting the contour information at the projection point on a two-dimensional plane, and a hole contour extraction unit that extracts a contour of a hole included in the actual endoscope image, in which the registration unit may perform registration between the three-dimensional image and the different image using the projection image and the extracted contour of the hole.

In the image registration apparatus according to this aspect of the invention, the projection point specification unit may specify one point on the graph structure as a starting point, may specify points included in a predetermined range as projection candidate points while following the graph structure from the starting point, and may specify the projection point from the projection candidate points.

In the image registration apparatus according to this aspect of the invention, the projection point specification unit may specify the projection point on the basis of shape information of the contour information.

In the image registration apparatus according to this aspect of the invention, the projection image generation unit may acquire information on a branch to which the projection point belongs and add the information on the branch to the projection image.

The image registration apparatus according to this aspect of the invention may further comprise: a visual point information estimation unit that estimates visual point information of the different image on the basis of a result of the registration process between the projection image and the different image and visual point information of the projection image.

In the image registration apparatus according to this aspect of the invention, the tubular structure may be the bronchus.

According to another aspect of the invention, there is provided an image registration method comprising: acquiring a three-dimensional image obtained by imaging a subject and an image different from the three-dimensional image; generating a graph structure of a tubular structure included in the three-dimensional image; acquiring contour information of the tubular structure at each point on the graph structure; and performing registration between the three-dimensional image and the different image on the basis of the contour information.

According to still another aspect of the invention, there may be provided a non-transitory computer readable recording medium storing a program that causes a computer to execute the image registration method according to the above-mentioned aspect of the invention.

According to still another aspect of the invention, there is provided an image registration apparatus comprising: a memory that stores a command to be executed by a computer; and a processor configured to executed the stored command, in which the processor executes a process of acquiring a three-dimensional image obtained by imaging a subject and an image different from the three-dimensional image; a process of generating a graph structure of a tubular structure included in the three-dimensional image; a process of acquiring contour information of the tubular structure at each point on the graph structure; and a process of performing registration between the three-dimensional image and the different image on the basis of the contour information.

According to the invention, a three-dimensional image obtained by imaging a subject and an image different from the three-dimensional image are acquired, and a graph structure of a tubular structure included in the three-dimensional image is generated. Further, contour information of the tubular structure at each point on the graph structure is acquired, and registration between the three-dimensional image and the different image is performed on the basis of the contour information. Here, the contour information may be acquired with a small amount of computation compared with a case where a volume rendering process or the like is performed. Accordingly, it is possible to perform registration between the three-dimensional image and the different image at high speed.

DESCRIPTION OF THE PREFERRED EMBODIMENTS

Figure 1:
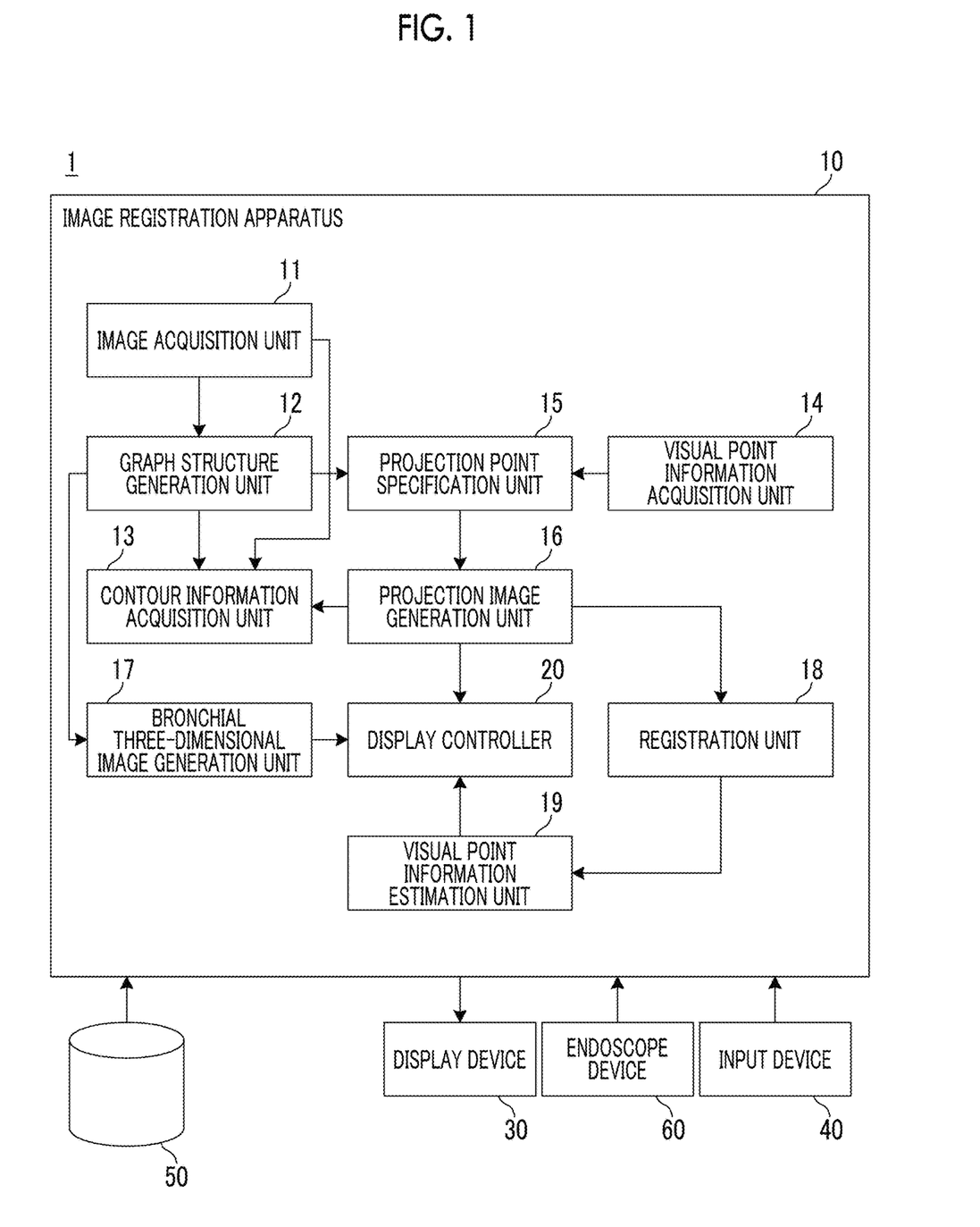
FIG. 1 is a block diagram showing a schematic configuration of an endoscope image diagnosis support system using an embodiment of an image registration apparatus of the invention.

Hereinafter, an endoscope image diagnosis support system using an embodiment of an image registration apparatus, an image registration method, and a non-transitory computer readable recording medium storing an image registration program of the invention will be described in detail with reference to the accompanying drawings. FIG. 1 is a block diagram showing a schematic configuration of an endoscope image diagnosis support system of this embodiment.

An endoscope image diagnosis support system 1 according to this embodiment includes an image registration apparatus 10, a display device 30, an input device 40, a three-dimensional image storage server 50, and an endoscope device 60, as shown in FIG. 1.

The image registration apparatus 10 is configured by installing an image registration program of this embodiment into a computer. The image registration program may be recorded on a recording medium such as a digital versatile disc (DVD) or a compact disc read only memory (CD-ROM) for distribution, and may be installed into a computer from the recording medium. Alternatively, the image registration program may be stored in a storage device of a server computer connected to a network or in a network storage in a state of being accessible from the outside, and may be downloaded and installed into a computer to be used by a doctor as necessary.

The image registration apparatus 10 includes a central processing unit (CPU), a semiconductor memory, a storage device such as a hard disk or a solid state drive (SSD) in which the above-described three-dimensional image registration program is installed, and the like. Through the above-mentioned hardware, an image acquisition unit 11, a graph structure generation unit 12, a contour information acquisition unit 13, a visual point information acquisition unit 14, a projection point specification unit 15, a projection image generation unit 16, a bronchial three-dimensional image generation unit 17, a registration unit 18, a visual point information estimation unit 19, and a display controller 20 as shown in FIG. 1 are configured. Further, as the image registration program installed in the hard disk is executed by the central processing unit, the respective units are operated, respectively. The image registration apparatus 10 may be provided with a plurality of processors or processing circuits that respectively perform an image acquisition process, a graph structure generation process, a contour information acquisition process, a visual point information acquisition process, a projection point specification process, a projection image generation process, a bronchial three-dimensional image generation process, a registration process, a visual point information estimation process, and a display control process.

The image acquisition unit 11 acquires a three-dimensional image of a subject obtained through imaging in advance before an operation or an inspection using an endoscope device, for example, and an actual endoscope image that is a two-dimensional endoscope image of the inside of the bronchus obtained by imaging using the endoscope device 60. As the three-dimensional image, for example, an image displayed by volume data that is reconfigured of slice data output from a CT apparatus, an MRI apparatus, or the like, an image displayed by volume data output from a multi slice (MS) CT apparatus or a cone beam CT apparatus, may be used. Further, a three-dimensional ultrasound image acquired by a three-dimensional echo ultrasonic apparatus may be used. The three-dimensional image is stored in advance together with identification information of the subject in the three-dimensional image storage server 50, and the image acquisition unit 11 reads out a three-dimensional image corresponding to identification information of a subject input through the input device 40 from the three-dimensional image storage server 50.

The graph structure generation unit 12 receives an input of a three-dimensional image acquired by the image acquisition unit 11, and generates a graph structure of a tubular structure included in the input three-dimensional image. In this embodiment, a graph structure of the bronchus is generated as the graph structure of the tubular structure. Hereinafter, an example of a method for generating a graph structure will be described.

In the bronchus included in the three-dimensional image, pixels corresponding to the inside of the bronchus show an air region, and thus, are displayed as a region indicating low CT values (pixel values) on a CT image, whereas a bronchial wall may be considered as a cylindrical or tubular structure indicating relatively high CT values. Thus, the bronchus is extracted by performing structure analysis of a shape based on a distribution of the CT values for each pixel.

The bronchus diverges in multiple stages, and as the end of a bronchial tube is approached, the diameter of the bronchial tube becomes smaller. In order to enable detection of bronchial tubes of different sizes, Gaussian pyramid images obtained by multiple resolution conversion of a three-dimensional image, that is, a plurality of three-dimensional images having different resolutions are generated in advance, and a detection algorithm is scanned for each of the generated Gaussian pyramid images to detect tubular structures having different sizes.

First, a Hessian matrix of each pixel of a three-dimensional image having each resolution is calculated, and it is determined whether the pixel is a pixel corresponding to the inside of a tubular structure from a magnitude correlation of eigenvalues of the Hessian matrix. The Hessian matrix refers to a matrix in which two-stage partial differential coefficients of density values in respective axes (an x-axis, a y-axis, and a z-axis of a three-dimensional image) are elements, and becomes a 3×3 matrix as follows.

$$\nabla^2 I = \begin{bmatrix} I_{xx} & I_{xy} & I_{xz} \\ I_{xx} & I_{xy} & I_{xz} \\ I_{xx} & I_{xy} & I_{xz} \end{bmatrix} \quad \text{Expression 1}$$

$$I_{xx} = \frac{\delta^2 I}{\delta x^2},$$

$$I_{xy} = \frac{\delta^2 I}{\delta x \delta y^2},$$

In a case where eigenvalues of the Hessian matrix in a certain pixel are $\lambda 1$, $\lambda 2$, and $\lambda 3$, in a case where two eigenvalues among the eigenvalues are large and one eigenvalue is close to 0, for example, when $\lambda 3 \gg \lambda 1$, $\lambda 2 \gg \lambda 1$, and $\lambda 1 \cong 0$ are satisfied, it is known that the pixel is a tubular structure. Further, an eigenvector corresponding to the smallest eigenvalue ($\lambda 1 \cong 0$) in the Hessian matrix coincides with a main axial direction of the tubular structure.

The bronchus may be indicated by the graph structure, but the tubular structure extracted as described above is not necessarily extracted as one graph structure in which all tubular structures are connected to each other, due to the influence of a tumor or the like. Thus, after extraction of the tubular structures is terminated from the entire three-dimensional image, whether the respective extracted tubular structures are within a predetermined distance and whether an angle formed by a direction of a basic line connecting certain points on two extracted tubular structures and a main axial direction of each tubular structure is within a predetermined angle are evaluated, and thus, whether a plurality of tubular structures are connected to each other is determined, and a connection correlation of the extracted tubular structures is reestablished. Through this reestablishment, the extraction of the graph structure of the bronchus is completed.

Figure 2:
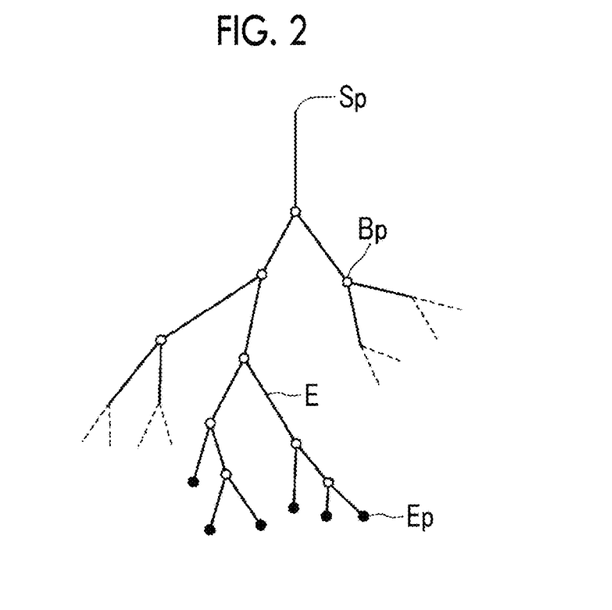
FIG. 2 is a diagram showing an example of a graph structure.

Further, by classifying the extracted graph structure into a starting point, end points, diverging points, and branches, and by connecting the starting point, the end points and the diverging points using the branches, it is possible to obtain a graph structure indicating the bronchus. In this embodiment, feature amounts such as the diameter of the bronchus at each position of the graph structure and the length of each branch (a length between diverging points of the bronchus) are also acquired together with the graph structure. FIG. 2 is a diagram showing an example of such a graph structure. In FIG. 2, Sp represents a starting point, a diverging point Bp is indicated by a white circle, an end point Ep is indicated by a black circle, and a branch E is indicated by a line.

As a method for generating a graph structure is not limited to the above-described method, and other known methods may be used.

Figure 3:
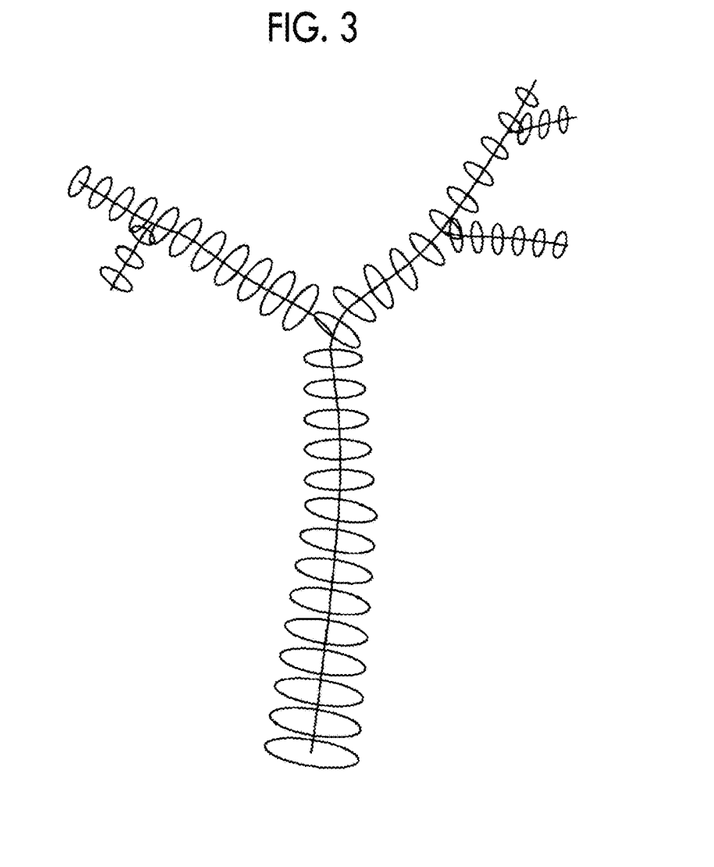
FIG. 3 is a diagram showing an example of contour information of the bronchus at each point on the graph structure.
Figure 4:
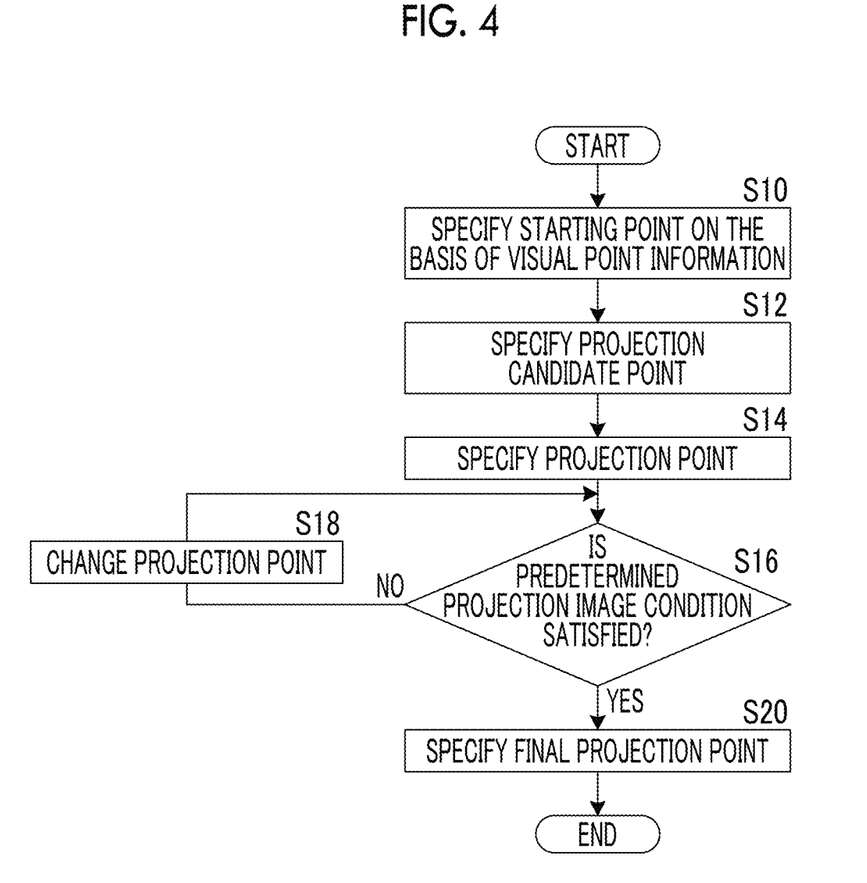
FIG. 4 is a flowchart illustrating a projection point specification method.

The contour information acquisition unit 13 acquires contour information of the bronchus at each point on a graph structure. The contour information acquisition unit 13 of this embodiment acquires contour information of a tubular structure detected in a case where the graph structure of the bronchus is generated as described above. The contour information is acquired at each point of the graph structure, but an interval between respective points may be set to an interval smaller than an interval between diverging points of the bronchus. For example, it is preferable to set the interval to about 1 mm to 2 mm. FIG. 3 is a diagram showing an example of contour information of the bronchus at each point on a graph structure. In FIG. 3, the graph structure of the bronchus is also included.

The visual point information acquisition unit 14 acquires visual point information inside the bronchus. The visual point information is set and input by a user using the input device 40, and the visual point information acquisition unit 14 acquires the visual point information input through the input device 40. The visual point information represents three-dimensional coordinates in a predetermined coordinate system in the bronchus. The setting and input of the visual point information may be designated by the user using the input device 40 such as a mouse on a three-dimensional image of the bronchus displayed on the display device 30, for example.

In this embodiment, the visual point information is set and input by a user, but the invention is not limited thereto, and the visual point information may be automatically set on the basis of a predetermined condition. Specifically, for example, the visual point information may be set in a base end portion of the bronchus, or the visual point information may be set in a first diverge from the base end portion.

The projection point specification unit 15 specifies one point on a graph structure as a starting point on the basis of visual point information, and specifies a projection point from respective points on the graph structure while following the graph structure from the starting point. Hereinafter, the specification of the projection point in the projection point specification unit 15 will be described with reference to a flowchart shown in FIG. 4 and FIGS. 5 to 10.

Figure 5:
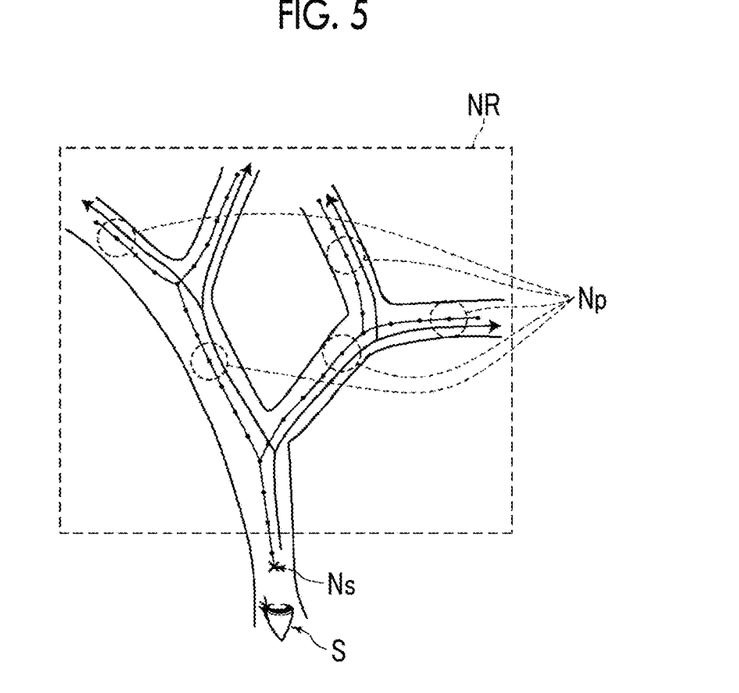
FIG. 5 is a diagram illustrating the projection point specification method.

The projection point specification unit 15 first specifies a point on a graph structure that is closest to visual point information S that is set and input by a user as a starting point Ns, as shown in FIG. 5 (step S10). Further, the projection point specification unit 15 specifies points included in a predetermined range NR as projection candidate points while following the graph structure toward a downstream side (a side opposite to a base end side) of the bronchus from the starting point Ns (step S12). As the range NR, a range of a predetermined distance from the starting point Ns may be used. Alternatively, a range in which the number of diverging points to be passed when following the graph structure from the starting point Ns is a predetermined number may be used as the range NR.

Then, the projection point specification unit 15 specifies partial projection points from the plurality of projection candidate points included in the predetermined range NR on the basis of a predetermined projection point condition (step S14). As the predetermined projection point condition, for example, a condition that a central point, an initial point, or a final point of each branch in the graph structure included in the range NR is a projection point may be used. The initial point and the final point refer to an initial point and a final point of each side when following the graph structure toward a downstream side. Further, a condition that with respect to each branch in the graph structure included in the range NR, an initial point spaced from a diverging point by a predetermined distance or longer is specified as a projection point may be used as the projection point condition. In FIG. 5, an example of the projection points Np specified in step S14 is indicated by a broken line circle.

Figure 6:
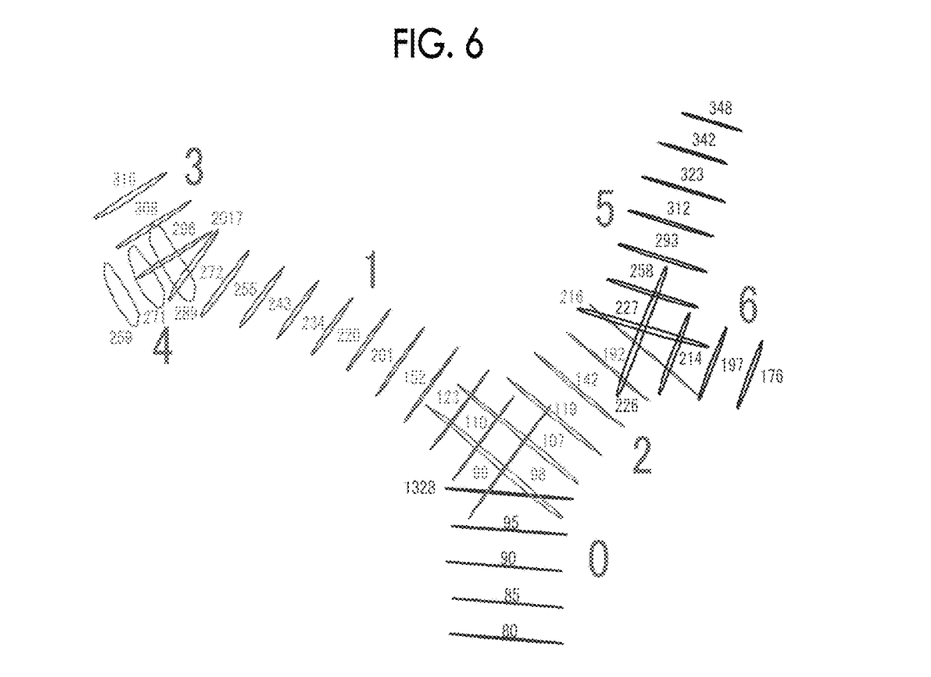
FIG. 6 is a diagram showing an example of contour information at each point on a graph structure.

Then, the projection point specification unit 15 confirms whether the projection points specified in step S14 satisfy a predetermined projection image condition (step S16). FIG. 6 is a diagram showing an example of contour information at each point on a graph structure in the range NR. In FIG. 6, for ease of illustration, contour information at a part of points is not illustrated. Further, numerical values of 0 to 6 shown in FIG. 6 represent branch numbers assigned to respective branches, and a numerical value shown in the vicinity of each piece of contour information represents a node number assigned to each point on the graph structure.

Here, for example, a method for specifying projection points in a case where the above-described starting point Ns is a node 80 shown in FIG. 6 will be described.

Figure 7:
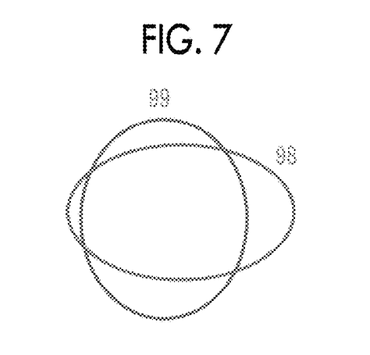
FIG. 7 is a diagram showing an example of a projection image.

First, in a case where the projection points specified in step S14 are a node 98 and a node 99 shown in FIG. 6, contour information at the two nodes 98 and 99 is projected on a two-dimensional plane to generate a projection image. Then, a projection image as shown in FIG. 7 is obtained. The two-dimensional plane is a plane orthogonal to a body axis of a subject. In the projection image shown in FIG. 7, two pieces of contour information overlap each other, and thus, the projection image is not preferable as a projection image. This is because the projection points specified in step S14 are excessively close to a diverging point.

In a case where two pieces of contour information overlap each other as in the projection image shown in FIG. 7, the projection point specification unit 15 changes projection points, generates a projection image again using contour information at the changed projection points, and confirms whether pieces of contour information on the re-generated projection image overlap each other. Specifically, the projection point specification unit 15 changes at least one of projection points of the nodes 98 and 99 to a projection point distant from the diverging point, and generates a projection image again using contour information at the changed projection point. For example, the projection point specification unit 15 changes the projection point of the node 98 to a projection point of a node 107, and changes the projection point of the node 99 to a projection point of a node 110.

Figure 8:
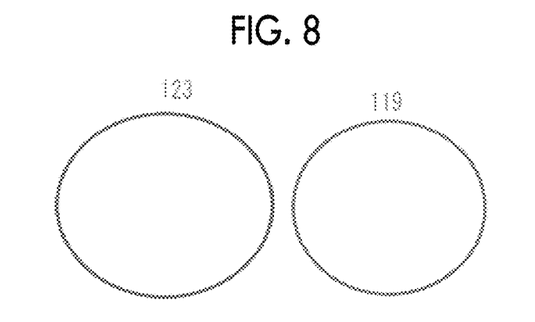
FIG. 8 is a diagram showing an example of a projection image generated using contour information of a first diverging bronchial tube.

That is, the projection point specification unit 15 confirms whether a projection image condition that pieces of contour information on a projection image do not overlap each other is satisfied. In a case where the projection image condition is not satisfied (NO in step S16), the projection point specification unit 15 changes the projection points on the basis of a predetermined condition (step S18). Further, the projection point specification unit 15 generates a projection image again using contour information at the changed projection points, confirms whether the projection image condition is satisfied, and repeats the change of the projection points and the generation of the projection image until the projection image condition is satisfied. FIG. 8 is a diagram showing a projection image generated using contour information at projection points of a node 123 and a node 119 that satisfy the projection image condition.

Figure 9:
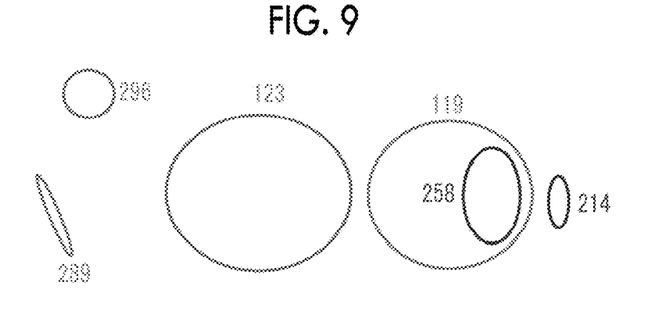
FIG. 9 is a diagram showing an example of a projection image generated so that pieces of contour information do not overlap each other.

Further, with respect to a branch 3 and a branch 4 connected to a tip of a branch 1 shown in FIG. 6 and a branch 5 and a branch 6 connected to a branch 2, in a similar way to the above description, the projection point specification unit 15 repeats change of projection points and generation of a projection image until the projection image condition that pieces of contour information on a projection image do not overlap each other is satisfied. As a result, it is assumed that a projection image shown in FIG. 9 is generated. The projection images shown in FIG. 9 includes contour information at a node 289 of the branch 4 and a node 296 of the branch 3 protruding from a node 123 of the branch 1 that is a parental branch, and contour information at a node 214 of the branch 6 protruding from contour information at a node 119 of the branch 2 that is a parental branch. It is preferable that such contour information is contour information that is not viewed on an actual endoscope image obtained by actually imaging the inside of the bronchus from the node 80 that is a starting point and is thus deleted.

Accordingly, the projection point specification unit 15 specifies, with respect to a child branch, projection points that satisfy a projection image condition that contour information of the child branch is included in contour information at a node of a parental branch. The projection image condition relating to the child branch is not limited thereto. For example, even though contour information of a child branch is not included in contour information at a node of a parental branch, in a case where a distance between the contour information at the node of the parental branch and the contour information of the child branch is within a predetermined threshold value, the contour information may remain as a final projection point without being deleted. Specifically, the contour information at the node 214 of the branch 6 shown in FIG. 9 may remain since it is close to the contour information at the node 119 of the branch 2. Further, even though contour information at a node of a child branch is included in contour information at a node of a parental branch, in a case where the shape of the contour information is an ellipse of which the ratio of a short diameter to a long diameter is equal to or smaller than a predetermined threshold value, as in contour information at the node 289 shown in FIG. 9, in a case where contour information at a node of a child branch cannot be projected, or in a case where the ratio of the magnitude of contour information at a node of a child branch to the magnitude of contour information at a node of a parental branch is equal to or smaller than a threshold value and the contour information at the node of the child branch is extremely small, the contour information may be deleted.

The projection point specification unit 15 repeats the change and the deletion of the projection points so that the projection image condition is satisfied, as described above, to specify final projection points (step S20).

Whether or not the above-described projection image condition is satisfied may be confirmed by using shape information of contour information at projection points. Specifically, the confirmation may be performed using, as the shape information, diameters of (radii, diameters, short diameters, long diameters, or the like) pieces of contour information and a distance between centers thereof, for example.

In the above description, a projection image is once generated using contour information at provisionally specified projection points, and whether the generated projection image satisfies a projection image condition to specify final projection points, but it is not essential that the projection image is generated. For example, on the basis of a positional correlation of the provisionally specified projection points on a three-dimensional coordinate space and the magnitudes of the contour information at the provisionally specified projection points, it may be confirmed whether the projection image condition is satisfied.

Further, in the above description, whether the contour information at the provisionally specified projection points satisfies the projection image condition is confirmed to specify final projection points, but it is not essential that the projection image condition is confirmed. For example, the projection points specified on the basis of the projection point condition in step S14 may be set as final projection points, and a projection image may be generated using contour information at the final projection points.

Figure 10:
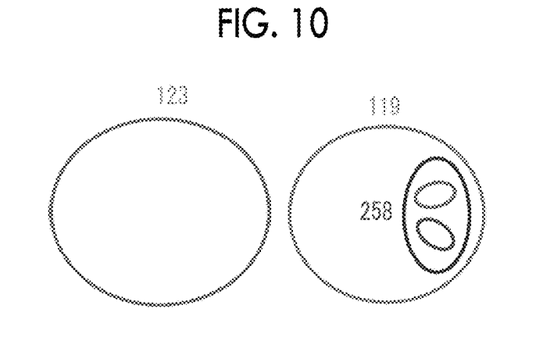
FIG. 10 is a diagram showing an example of a projection image generated using contour information at a projection point that is finally specified.

Returning to FIG. 1, the projection image generation unit 16 generates a projection image using the contour information at the final projection points specified by the projection point specification unit 15. FIG. 10 is a diagram showing a projection image generated using contour information at projection points that are finally specified.

The bronchial three-dimensional image generation unit 17 performs a volume rendering process with respect to a three-dimensional image acquired in the image acquisition unit 11 to generate a bronchial three-dimensional image that represents a form of the bronchus, and outputs the generated bronchial three-dimensional image to the display controller 20.

The registration unit 18 acquires an actual endoscope image that is an endoscope image of a two-dimensional image obtained by actually imaging the inside of the bronchus by the endoscope device 60, and performs a registration process between the actual endoscope image and a projection image. The projection image that is a target of the registration process is generated for each diverging point of a graph structure, for example, and a deviation amount with respect to a projection image having a minimum deviation amount with respect to the actual endoscope image among the plurality of generated projection images is acquired as a registration result in the registration process. As the registration process, for example, rigid-body registration or non-rigid-body registration may be used.

Figure 11:
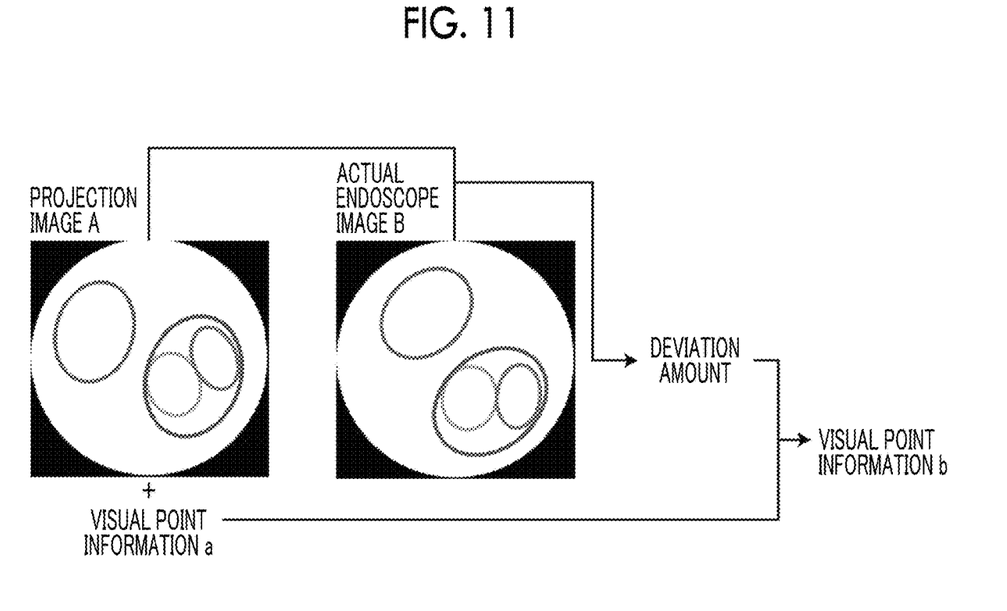
FIG. 11 is a diagram illustrating a method for estimating visual point information of an actual endoscope image on the basis of a deviation amount between a projection image and an actual endoscope image and visual point information of a projection image.

The visual point information estimation unit 19 estimates visual point information (corresponding to a distal end position of an endoscope) of an actual endoscope image using a registration result in the registration unit 18. That is, as shown in FIG. 11, on the basis of a deviation amount between a projection image A obtained through the registration process and an actual endoscope image B, and visual point information of the projection image A, the visual point information estimation unit 19 estimates visual point information b of the actual endoscope image B. As a method for estimating the visual point information b of the actual endoscope image B, for example, in a case where only the magnitude of contour information included in the projection image A and the size of a hole of the bronchus included in the actual endoscope image B are different from each other, it is possible to estimate the visual point information b by moving, on the basis of a scaling rate of the hole of the bronchus with respect to the magnitude of the contour information and a distance between visual point information a of the projection image A and a projection surface, the visual point information a with respect to the projection surface. The method for estimating the visual point information b is not limited thereto, and various estimation methods based on geometrical relations may be used.

The display controller 20 displays a projection image generated by the projection image generation unit 16, a bronchial three-dimensional image generated by the bronchial three-dimensional image generation unit 17, and an actual endoscope image acquired by the endoscope device 60 on the display device 30. Here, the display controller 20 displays three-dimensional coordinates of the visual point information b estimated by the visual point information estimation unit 19 on the display device 30. Further, the visual point information b may be displayed on the bronchial three-dimensional image displayed on the display device 30.

The display device 30 includes a liquid crystal display, or the like. Further, the display device 30 may be configured of a touch panel, and may be commonly used as the input device 40.

The input device 40 includes a mouse, a keyboard, or the like, and receives various setting inputs from a user.

Figure 12:
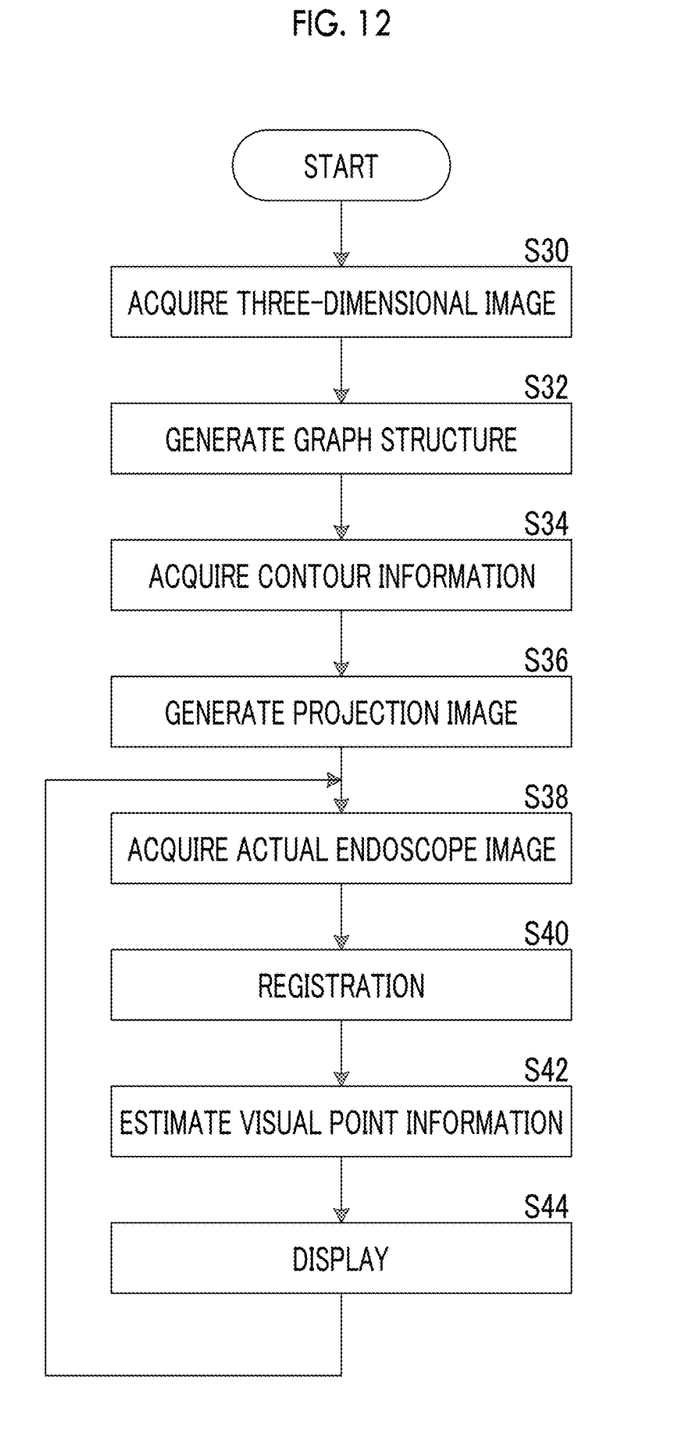
FIG. 12 is a flowchart showing processes performed in this embodiment.

Next, a process performed in this embodiment will be described. FIG. 12 is a flowchart showing processes performed in this embodiment. First, the image acquisition unit 11 acquires a three-dimensional image (step S30). Then, the graph structure generation unit 12 generates a graph structure of a tubular structure included in the three-dimensional image acquired by the image acquisition unit 11 (step S32).

Further, the contour information acquisition unit 13 acquires contour information of the tubular structure at each point on the graph structure (step S34). Further, the projection image generation unit 16 generates a projection image obtained by projecting contour information at projection points specified by the process shown in FIG. 4 on a two-dimensional plane (step S36).

Then, the image acquisition unit 11 acquires an actual endoscope image (step S38), and the registration unit 18 performs registration between the three-dimensional image and the actual endoscope image using the projection image (step S40). Further, the visual point information estimation unit 19 estimates visual point information of the actual endoscope image using a registration result in the registration unit 18 (step S42). Further, the display controller 20 displays the projection image, the bronchial three-dimensional image, the actual endoscope image, and the visual point information b of the actual endoscope image estimated by the visual point information estimation unit 19 on the display device 30 (step S44), and then, the procedure returns to step S38. Thus, registration between an actual endoscope image acquired at each position while an endoscope is moving in the bronchus and a three-dimensional image is performed.

As described above, according to this embodiment, a graph structure of the bronchus included in a three-dimensional image is generated, and contour information of the bronchus at each point on the graph structure is acquired. Further, registration between the three-dimensional image and an actual endoscope image is performed on the basis of contour information. Here, the contour information may be acquired with a small amount of computation compared with a case where a volume rendering process or the like is performed. Accordingly, according to this embodiment, it is possible to perform registration between a three-dimensional image and an actual endoscope image at high speed.

Further, in this embodiment, visual point information inside the bronchus is acquired, one point on a graph structure is specified as a starting point on the basis of the visual point information, a projection point is specified from respective points on the graph structure while following the graph structure from the starting point, and a projection image obtained by projecting contour information at the projection point on a two-dimensional plane is generated. Thus, it is possible to generate a projection image in which clear features remain so that a registration process can be performed with respect to an actual endoscope image at high speed.

Figure 13:
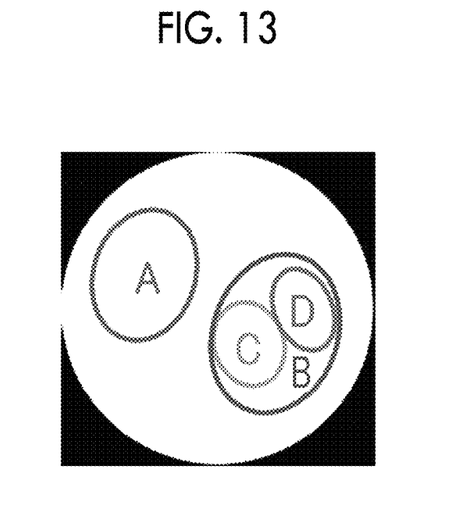
FIG. 13 is a diagram showing an example in which branch information is additionally displayed with respect to a projection image.

In the above-described embodiment, the projection image generation unit 16 may acquire information on a branch to which a projection point belongs and may add the acquired information on acquired branch to a projection image, to thereby display information on the branch on the projection image. FIG. 13 is a diagram showing an example in which "A" to "D" that correspond to branch information are additionally displayed with respect to a projection image.

Figure 14:
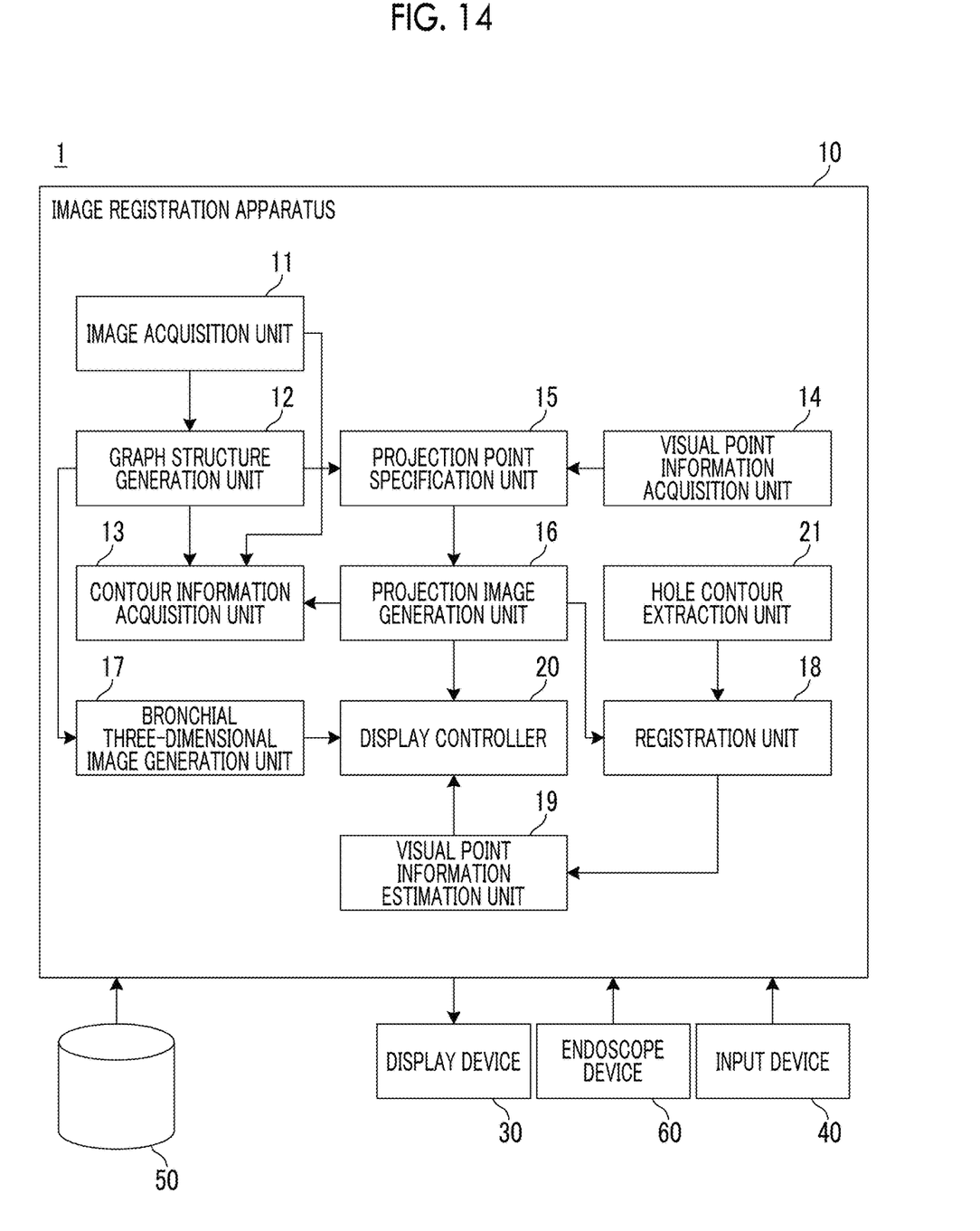
FIG. 14 is a block diagram showing a schematic configuration of an endoscope image diagnosis support system using another embodiment of the image registration apparatus of the invention.
Figure 15:
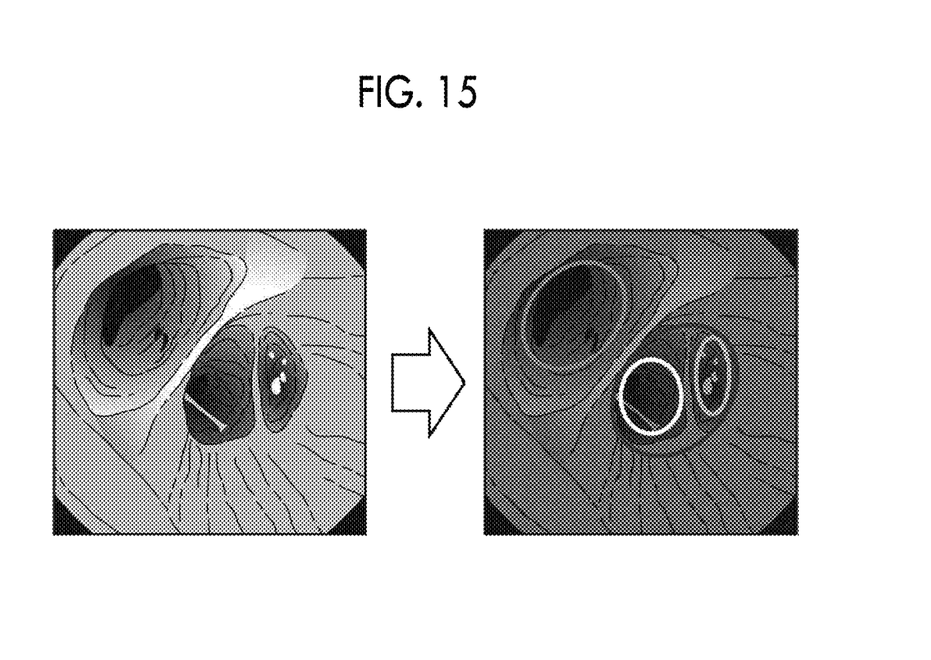
FIG. 15 is a diagram showing an example of a contour image obtained by extracting hole contours from an actual endoscope image.

Further, in the above-described embodiment, in the registration unit 18, in a case where a registration process is performed, an actual endoscope image output from the endoscope device 60 is used, but the invention is not limited thereto. For example, as shown in FIG. 14, the hole contour extraction unit 21 that extracts a contour of a hole from the actual endoscope image may be provided in the image registration apparatus 10. The hole contour extraction unit 21 extracts a contour of a hole from an actual endoscope image to generate a contour image, as shown in FIG. 15. Specifically, the hole contour extraction unit 21 detects a region where pixels having a brightness that is equal to or smaller than a threshold value are circularly distributed from the actual endoscope image, and extracts a contour of the detected region as a contour of a hole to generate a contour image. Thus, it is possible to perform a registration process between a projection image and an actual endoscope image performed by the registration unit 18 at high speed.

Figure 16:
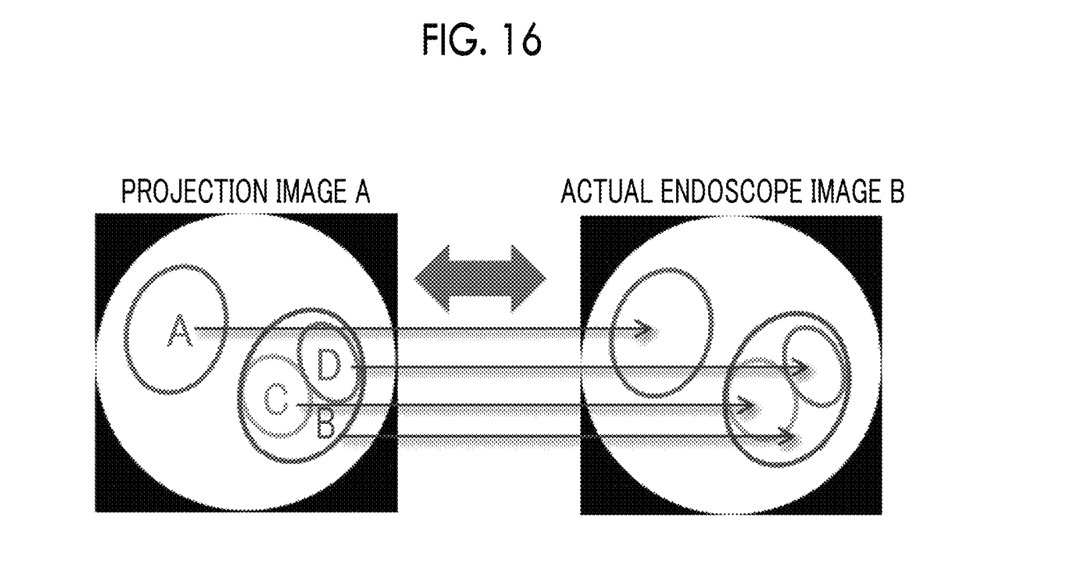
FIG. 16 is a diagram illustrating a method for estimating holes (contour information) included in an actual endoscope image corresponding to contour information included in a projection image.

In addition, in the above-described embodiment, branch information may be added with respect to a hole included in an actual endoscope image output from the endoscope device 60, on the basis of contour information included in a projection image and information on a branch added to the contour information. In this embodiment, since registration between a projection image and an actual endoscope image is performed, as shown in FIG. 16, it is possible to easily perform association between contour information included in a projection image A and a hole included in an actual endoscope image B. Accordingly, "A" to "D" that correspond to branch information added to respective pieces of contour information on the projection image A may be added to corresponding holes included in the actual endoscope image B to then display the actual endoscope image B on the display device 30. The addition of branch information to the actual endoscope image B may be performed by the display controller 20, and an exclusive processing unit for the addition of branch information to the actual endoscope image B may be provided.

Further, in the above-described embodiment, registration between a projection image generated from a three-dimensional image and an actual endoscope image is performed, but the invention may be similarly applied to a case where registration between two three-dimensional images is performed. In this case, the image acquisition unit 11 acquires two three-dimensional images that are targets of registration. The graph structure generation unit 12 generates a graph structure of a tubular structure included in each of two three-dimensional images. The contour information acquisition unit 13 acquires contour information of the bronchus at each point on the graph structure, with respect to each of two three-dimensional images. The visual point information acquisition unit 14 acquires visual point information with respect to each of two three-dimensional images. The projection point specification unit 15 specifies projection points with respect to each of two three-dimensional images. The projection image generation unit 16 generates a projection image using contour information at final projection points specified by the projection point specification unit 15, with respect to each of two three-dimensional images. The bronchial three-dimensional image generation unit 17 performs a volume rendering process with respect to each of two three-dimensional images to generate a bronchial three-dimensional image indicating a form of the bronchus.

The registration unit 18 performs registration between two three-dimensional images. Specifically, the registration unit 18 performs registration between a projection image (referred to as a first projection image) generated from one three-dimensional image (referred to as a first three-dimensional image) among two three-dimensional images and a projection image (referred to as a second projection image) generated from the other three-dimensional image (referred to as a second three-dimensional image). That is, the registration unit 18 registers the second three-dimensional image with respect to the first three-dimensional image. Here, a projection image that is a target of the registration process is generated, for example, at each diverging point of a graph structure, with respect to each of two three-dimensional images. Here, one projection image for registration is selected from a plurality of first projection images by an operator. The selection of the projection image may be performed by an input through the input device 40. Further, between one selected first projection image and a plurality of second projection images, a deviation amount relating to a projection image having a minimum deviation amount with respect to an actual endoscope image among the plurality of second projection images is acquired as a registration result in the registration process. As the registration process, for example, rigid-body registration or non-rigid-registration may be used. In the above description, the second three-dimensional images are registered with respect to the first three-dimensional image, but one second projection image may be selected from the second three-dimensional images, and the first three-dimensional images may be registered with respect to the second three-dimensional image.

The visual point information estimation unit 19 estimates visual point information of the second three-dimensional image, corresponding to visual point information of the selected first projection image using a registration result in the registration unit 18. In this case, the projection image generation unit 16 re-generates a projection image relating to the second three-dimensional image on the basis of the estimated visual point information of the second three-dimensional image. Further, the display controller 20 displays the selected first projection image and the re-generated projection image relating to the second three-dimensional image on the display device 30.

EXPLANATION OF REFERENCES

1: endoscope image diagnosis support system
10: image registration apparatus
11: image acquisition unit
12: graph structure generation unit
13: contour information acquisition unit
14: visual point information acquisition unit
15: projection point specification unit
16: projection image generation unit
17: bronchial three-dimensional image generation unit
18: registration unit
19: visual point information estimation unit
20: display controller
21: hole contour detection unit
30: display device
40: input device
50: three-dimensional image storage server
60: endoscope device
A: projection image
B: actual endoscope image
a, b, S: visual point information
Bp: diverging point
E: branch
Ep: end point
Np: projection point
NR: predetermined range
Ns: starting point

What is claimed is:
1. An image registration apparatus comprising:
   an image acquisition unit that acquires a three-dimensional image obtained by imaging a subject and an image different from the three-dimensional image;
   a graph structure generation unit that generates a graph structure of a tubular structure included in the three-dimensional image;

a contour information acquisition unit that acquires contour information of the tubular structure at each point on the graph structure; and a registration unit that performs registration between the three-dimensional image and the different image on the basis of the contour information, the different image is the image different from the three-dimensional image.

2. The image registration apparatus according to claim 1, wherein the different image is an actual endoscope image acquired using an endoscope inserted in the tubular structure.

3. The image registration apparatus according to claim 2, further comprising:

a visual point information acquisition unit that acquires visual point information inside the tubular structure;

a projection point specification unit that specifies a projection point from respective points on the graph structure on the basis of the visual point information and the graph structure; and a projection image generation unit that generates a projection image obtained by projecting the contour information at the projection point on a two-dimensional plane, wherein the registration unit performs registration between the three-dimensional image and the different image using the projection image.

4. The image registration apparatus according to claim 3, wherein the projection point specification unit specifies one point on the graph structure as a starting point, specifies points included in a predetermined range as projection candidate points while following the graph structure from the starting point, and specifies the projection point from the projection candidate points.

5. The image registration apparatus according to claim 2, further comprising:

a visual point information acquisition unit that acquires visual point information inside the tubular structure;

a projection point specification unit that specifies a projection point from respective points on the graph structure on the basis of the visual point information and the graph structure;

a projection image generation unit that generates a projection image obtained by projecting the contour information at the projection point on a two-dimensional plane, and a hole contour extraction unit that extracts a contour of a hole included in the actual endoscope image, wherein the registration unit performs registration between the three-dimensional image and the different image using the projection image and the extracted contour of the hole.

6. The image registration apparatus according to claim 5, wherein the projection point specification unit specifies one point on the graph structure as a starting point, specifies points included in a predetermined range as projection candidate points while following the graph structure from the starting point, and specifies the projection point from the projection candidate points.

7. The image registration apparatus according to claim 5, wherein the projection point specification unit specifies the projection point on the basis of shape information of the contour information.

8. The image registration apparatus according to claim 1, wherein the different image is a three-dimensional image, different from the three-dimensional image, obtained by imaging the subject.

9. The image registration apparatus according to claim 8, further comprising:

a visual point information acquisition unit that acquires visual point information inside the tubular structure;

a projection point specification unit that specifies a projection point from respective points on the graph structure on the basis of the visual point information and the graph structure; and a projection image generation unit that generates a projection image obtained by projecting the contour information at the projection point on a two-dimensional plane, wherein the registration unit performs registration between the three-dimensional image and the different image using the projection image.

10. The image registration apparatus according to claim 9, wherein the projection point specification unit specifies one point on the graph structure as a starting point, specifies points included in a predetermined range as projection candidate points while following the graph structure from the starting point, and specifies the projection point from the projection candidate points.

11. The image registration apparatus according to claim 1, further comprising:

a visual point information acquisition unit that acquires visual point information inside the tubular structure;

a projection point specification unit that specifies a projection point from respective points on the graph structure on the basis of the visual point information and the graph structure; and a projection image generation unit that generates a projection image obtained by projecting the contour information at the projection point on a two-dimensional plane, wherein the registration unit performs registration between the three-dimensional image and the different image using the projection image.

12. The image registration apparatus according to claim 11, wherein the projection point specification unit specifies one point on the graph structure as a starting point, specifies points included in a predetermined range as projection candidate points while following the graph structure from the starting point, and specifies the projection point from the projection candidate points.

13. The image registration apparatus according to claim 12, wherein the projection point specification unit specifies the projection point on the basis of shape information of the contour information.

14. The image registration apparatus according to claim 11, wherein the projection point specification unit specifies the projection point on the basis of shape information of the contour information.

15. The image registration apparatus according to claim 11, wherein the projection image generation unit acquires information on a branch to which the projection point belongs and adds the information on the branch to the projection image.

16. The image registration apparatus according to claim 11, further comprising:

a visual point information estimation unit that estimates visual point information of the different image on the basis of a result of the registration process between the projection image and the different image and visual point information of the projection image.

17. The image registration apparatus according to claim 1, wherein the tubular structure is the bronchus.

18. An image registration method using the image registration apparatus according to claim 1 comprising:
acquiring the three-dimensional image obtained by imaging the subject and the image different from the three-dimensional image;
generating the graph structure of the tubular structure included in the three-dimensional image;
acquiring the contour information of the tubular structure at each point on the graph structure; and
performing registration between the three-dimensional image and the different image on the basis of the contour information.

19. A non-transitory computer readable recording medium storing an image registration program that causes a computer to function as the image registration apparatus according to claim 1, the image registration program causes the computer to execute:
a process of acquiring the three-dimensional image obtained by imaging the subject and the image different from the three-dimensional image;
a process of generating the graph structure of the tubular structure included in the three-dimensional image;
a process of acquiring the contour information of the tubular structure at each point on the graph structure; and
a process of performing registration between the three-dimensional image and the different image on the basis of the contour information.

20. An image registration apparatus comprising:
a memory that stores a command to be executed by a computer; and
a processor configured to executed the stored command,
wherein the processor executes a process of acquiring a three-dimensional image obtained by imaging a subject and an image different from the three-dimensional image; a process of generating a graph structure of a tubular structure included in the three-dimensional image; a process of acquiring contour information of the tubular structure at each point on the graph structure; and a process of performing registration between the three-dimensional image and the different image on the basis of the contour information, the different image is the image different from the three-dimensional image.

* * * * *